United States Patent Office 2,810,693
Patented Oct. 22, 1957

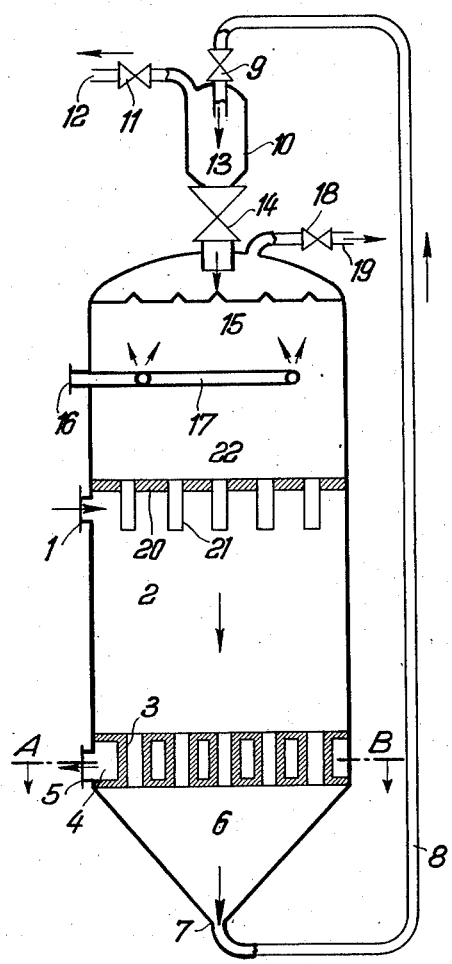
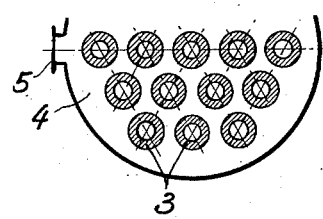

2,810,693

TREATMENT OF LIQUIDS WITH GRANULAR ION EXCHANGERS

Werner Wisfeld and Rolf-Karl Dorn, Frankfurt am Main, and Erich Herrmann, Heidelberg, Germany, assignors, by mesne assignments, to Infilco Incorporated, Tucson, Ariz.

Application December 18, 1953, Serial No. 399,122

Claims priority, application Germany December 22, 1952

9 Claims. (Cl. 210—33)

This invention relates to the treatment of liquids with granular ion exchangers.

In the treatment of liquid with granular ion exchangers, it is known to feed a liquid to be treated to a bed of granular ion exchanger with a substantially uniform flow rate and to remove a quantity of partially or completely exhausted granular ion exchanger from the beds, pass the removed granular ion exchanger in contact with a regenerating liquid in a regeneration zone which follows the treatment zone and return the regenerated exchanger to the treatment zone.

In this process, an undesired mixing of the liquids which come into contact one after the other with the granular ion exchangers occurs. In particular, the regenerating liquid often passes into the discharging treated liquid.

One object of this invention is to prevent the above mentioned undesired mixing.

A further object of this invention is to maintain the pressure losses occurring by the liquid passing through the process so low that randon flow conditions will not occur.

A still further object of this invention is to allow the use of high flow velocities and substantially increase the through-put of the apparatus used in this process.

These and still further objects will become apparent from the following description read in conjunction with the drawings in which:

Fig. 1 is a diagrammatic vertical section of an embodiment of an apparatus for effecting the ion exchange treatment in accordance with the invention;

Figure 2:
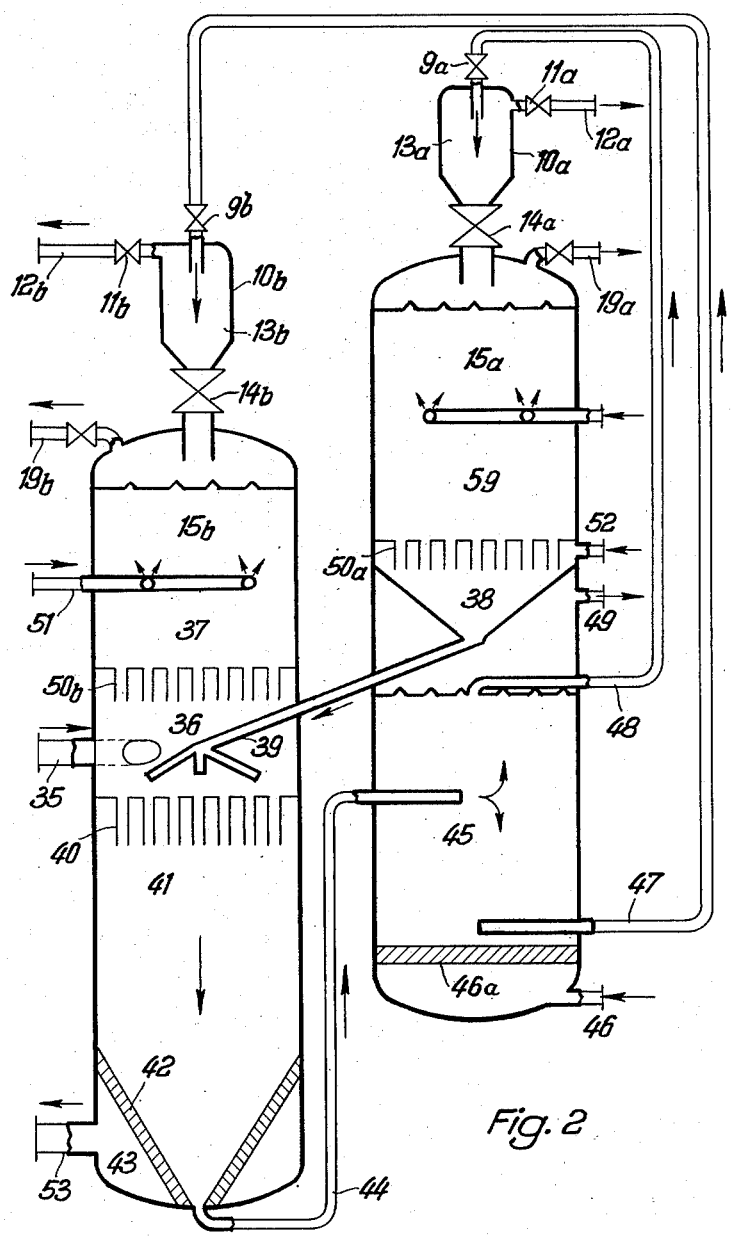
Fig. 2 is a diagrammatic vertical section of a different embodiment of an apparatus in accordance with the invention for effecting the treatment of liquids with granular ion exchangers; and, Fig. 3 is a diagrammatic cross-section of the apparatus shown in Fig. 1 through the section line A—B.

In accordance with the invention, the liquid to be treated is passed through a compact bed of granular ion exchanger in a treatment zone. The spent or partially spent, ion exchanger is conveyed from the bed through a substantially closed circuit to a lock chamber. The conveying is preferably effected by a portion of the liquid passing through the bed. The spent exchanger is passed from the lock chamber to a regeneration zone, preferably after separation of at least a portion of the conveying liquid. The regeneration zone is preferably positioned above the treatment zone, as for example, in the same container. The spent exchanger material is regenerated in the regeneration zone by contact with a regeneration liquid and thereafter returned to the bed of granular ion exchanger. The treated liquid is recovered after passing through the bed of granular ion exchanger. The whole operation is preferably effected in a substantially continuous and preferably uniform flow cycle.

The lock chamber is a substantially inclosed chamber the inlets into which and outlets from which are controlled by valves. By use of this lock chamber any pressure differences present in the system bay be overcome and the desired flow conditions may be maintained.

Referring to Fig. 1, the bed of granular ion exchanger is maintained in the space 2 of the vertical container. The liquid to be treated is passed in through the connection 1 and comes in contact with the compact bed of granular ion exchanger in this space 2. During the contacting, the ion exchanger process takes place as, for example, in the softening of water or removal of salts therefrom. Flow velocities of, for example, 100 meters per hour may be used. Due to the fact that the ion exchangers are in the form of compact beds, it is possible to use relatively small apparatus and relatively small quantities of exchanger material so that both the space available for the process and the charges of granular ion exchanger may be maintained small and utilized in the best possible manner.

It has been found that the granular ion exchanger and in particular fine granular ion exchanger having a synthetic resin base as, for example, phenolformaldehyde resins or polystyrene resins can be easily conveyed with liquids, removed from containers and can be caused to deposit in compact beds. The mixture of granular ion exchanger and liquid retains its ability to flow if there is a large amount of granular ion exchanger and only a small amount of liquid present. Furthermore, the compact beds of granular ion exchanger can be kept in motion by means of the liquids which flow through these beds. The individual granules of the beds scarcely move with respect to each other, but the bed as a whole flows with the liquid.

Thus, as the liquid flows downward through the bed from the conduit 1, the bed as a whole moves downward with the flow of liquid. The liquid then passes through the liquid permeable walls of the tubes 3 into the collector space 4, as can best be seen from Fig. 3, and leaves the apparatus through the connection 5. A portion of the liquid treated passes with the downwardly moving bed of granular ion exchanger into and through the conical space 6 which is filled with exchanger material. The granular ion exchanger is in the form of a compact bed extending from the space 2 through the conical space 6. As a part of the treated liquid passes out of the conical space 6 through the lower end 7, it flushes a portion of the granular ion exchanger from the bed and carries the same through the riser pipe 8 into the lock chamber 10. The lock chamber 10 may be closed at its inlet side by the valve 9 and may be closed on its outlet side into the chamber by the valve 14.

The pressure gradient required for flushing granular ion exchanger into the lock chamber may be created by maintaining a sufficient excess pressure in the treatment zone and by providing the lock chamber with a free discharge outlet for the conveying liquid. The lock chamber 10 is provided with a sufficiently large cross-section so that the conveying liquid and granular ion exchanger will separate therein. The conveying liquid leaves the apparatus through the pipe 12 after passage through the regulating valve 11. The quantity of exchanger material conveyed per unit time can be easily adjusted or regulated as, for example, by means of this regulating valve 11 and the discharge outlet to the lock chamber. The lock chamber, furthermore, makes it possible to convey the granular ion exchanger from regions of lower pressure to regions of higher pressure or vice versa. The arrangement has the advantage that the granular ion exchangers are not subjected to any undesirable mechanical stresses. At the same time, any undesired flow of liquid through the lock chamber can be prevented. The ion exchanger material is allowed to accumulate in the interior 13 of the lock chamber. When the lock chamber is full of accumulated granular ion exchanger, the valves 11 and 9 are closed and the valve 14 is opened, opening passage to the upper portion of the main chamber into which the exchanger material drops.

Instead of one lock chamber, a number of lock chambers may also be provided. One lock chamber may be filled while the other is being emptied, in which manner, a continuous feeding and discharge of the exchanger material is assured. Instead of the intermittently acting lock chamber as described, the same may be constructed so as to operate in a continuous manner as, for example, in the form of a bucket wheel. This also makes possible the maintaining of a continuous circulation of the exchanger material.

As the exchanger material drops into the main chamber through the shut-off valve 14, it falls directly into the regenerating zone 15. In this zone, the exchanger material comes in contact with an upwardly flowing stream of regeneration solution. The latter enters in a high concentration through the connection 16 and is distributed by means of a ring distributor 17 and is picked up by the rising stream of wash liquid which brings the same to the desired concentration. After passage through the regeneration zone in counter current contact with the exchanger material thus regenerating the same, the regeneration liquid is finally discharged through the control valve 18 in connection 19. The wash liquid which passes upward and brings the regeneration solution to the desired concentration, is a stream of wash liquid which passes upwardly from the stream of untreated liquid entering at 1. The wash liquid passes upward through the permeable filter plate 20 and also, to a small extent, through the down pipes 21 into the washing zone 22 where it washes the regenerated granular ion exchanger, removing the residual regenerating agent therefrom. The quantity of wash liquid may be adjusted by regulating valve 18 in such a manner that aside from the regenerating agent, the quantity of wash liquid which is desired in each case can also flow through. The regeneration zone, washing zone, treating zone, shown in this embodiment are all of the same diameter and are positioned within a common container. The regenerated granular ion exchanger after passing through the washing zone 22 and being washed, passes downwardly through the pipes 21 and back to the bed of granular ion exchanger in the treating zone 2.

In this manner, the bed of granular ion exchanger may retain its activity and a high treating through-put may be maintained.

A single type of granular ion exchanger or a plurality of types of ion exchangers may be used either singly or mixed in accordance with the invention. In this connection, there is concerned either a mixture of physically and/or chemically differing granular ion exchangers or merely exchangers which have gone through different types of regeneration treatments. Separating and mixing devices in which the granular ion exchangers are mixed or separated on the basis of their different physical properties corresponding to further use to which they may be put can suitably be provided in the ion exchanger cycle.

The embodiment as shown in Fig. 2 is particularly well adapted for the removal of salts from water and is characterized by a particularly high degree of economy. The water to be treated enters the mixing zone 36 of the chamber on the left-hand side of the drawing tangentially through the connection 35. The tangential entry improves the mixing of the cation exchanger material coming from the final washing zone 37 directly above with the freshly regenerated and washed anion exchanger material coming from the collector funnel 38 through the distributing line 39. The tube plate 40 brakes the motion of the water and introduces a uniform downward flow motion of the exchange mixture and water which is to be desalted in the desalting zone 41. As the water to be treated in the ion exchanger consisting of the mixture of cation and anion exchanger passes down into the zone 41, a bed of granular ion exchanger is formed through which the water flows thereby removing the salt.

If, for example, such a bed of exchanger material is flushed with quantities of liquid which are flowing relatively rapidly upwardly or, as in the case shown, downwardly, against a filter device which permits the passage of a liquid but retains the exchange particles, a compact bed of the granular ion exchanger will be formed in front of this filter. In this compact bed, the individual particles of the granular ion exchanger assume such a position that the bed bulk is filled by the maximum amount of ion exchanger material.

The bed formed in the desalting zone 41 forms against the filter 42 which allows the passage of the water therethrough but which retains the granular ion exchanger. The bed moves through the apparatus in the manner of a viscous liquid and is not loosened by the liquid flowing through it.

The filter 42 is of approximately conical shape with an opening at the apex of the cone. A portion of the granular ion exchanger is flushed away from the bed at this opening at the cone end and is flushed into the conveyor line 44. In this manner, the entire content of granular ion exchanger in the bed is moved downward to the extent that the exchanger material is removed at this opening through the conveyor line 44.

The desalted water, after passing through the filter 42 into the collection space 43, is discharged through the pipe 53.

At the same time, the portion of the granular ion exchanger flushed from the bed through the conveyor line 44 is passed into the separating zone 45. The separating zone is fed water through the connection 46 and which passes upward through the distributor plate 46a. As the water rises upward through the separating zone, it causes separation of the mixture of cation and anion exchangers. Due to the difference in specific gravity, the heavier cation exchanger moves downwardly toward the lower part of the separating zone while the lighter anion exchanger separates in the upper part of the separating zone 45. The heavier cation exchanger is removed through the conduit 47 into the space 13b of the lock chamber 10b.

At the same time, the anion exchanger flows upward through the conduit 48 into the space 13a of the lock chamber 10a. The major portion of the water used for the separation of the exchanger mixture is discharged through the outlet 49 and may be recycled to the separating zone 45 through the connection 46 by means of a pump. The velocity of the water conducted through the zone 45 is so adjusted that a good separation of anion exchanger from the cation exchanger occurs. For this purpose, there may advantageously be used velocities of between 2 and 10 meters per hour referred to the free cross-section of the zone 45. The quantities of water which serve for the transportation of the granular ion exchangers through the conduits 47 and 48 are obtained from the lock chambers 10a and 10b, through the pipes 12a and 12b respectively, which are provided with the regulating and shut-off valves 11a and 11b respectively.

The operation of the lock chambers 10a and 10b is identical to that of the lock chamber 10 as described in connection with the embodiment shown in Fig. 1. The cation exchanger separates from its liquid in the space 13b and the anion exchanger separates from the liquid used to convey it in the chamber space 13a. The separated conveying liquid is removed as described through the valves 11a and b and conduits 12a and b. The valves 9b and 9a leading into the lock chambers are then closed and the valves 14b and 14a leading from the lock chambers to the main chambers are opened and the granular exchangers pass into the corresponding regenerating zones 15b and 15a and washing zones 37 and 59 for the cation exchanger and anion exchanger respectively. For washing of the cation exchanger untreated water entering from the conduit 35 rises through the tube plate 50b into the washing zone 37, up through the regeneration zone 15b. This water scrubs the acid containing cation exchanger so as to remove as much of the acid as possible and then dilutes the regeneration solution entering through connection 51. The wash water then passes together with the regeneration solution through the regenerating zone 15b and the outlet 19b.

The washing zone 59 for the anion exchanger is fed by a stream of water from which the cations or salts have previously been removed. This water enters through the connection 52 and then passes upwards through the tube plate 50a, through the washing zone 59 and through the regenerating zone 15a and then discharges through the pipe 19a. The degree of washing in connection with the final washing of the cation and anion exchanger does not play any decisive role with respect to the residual salt content in the desalted water discharging at connection 53. The incompletely washed out cation and anion exchangers mutually neutralize each other within the mixing zone 36. It is, however, desirable to have an extensive degree of washing so that the capacity of the granular exchangers is not necessarily restricted by residues of regenerating agent.

The anion exchanger flows downwardly from the washing zone 59, through the tube plate 50a, into the funnel 38, through the conduit 39 and into the mixing zone 36 where it is mixed with the cation exchanger passing from the washing zone 37 through the tube plate 50b. The anion and cation exchangers are mixed by their relative flow motions and by the tangential entry of the water to be treated through 35. The mixture passes down through the tubes 40 and becomes part of the bed in the desalting zone 41.

In accordance with the invention, the use of the lock chambers with various control valves makes the use of general pumps of any kind for the purpose of conveying the exchanger material unnecessary. The exchanger granules are, therefore, no longer stressed beyond their mechanical resistance and are not exposed to any large accelerational forces nor any stresses due to moving apparatus parts. The various valve members are advisedly only closed when their inner cross-section is free of exchanger material.

In many cases, it is advantageous to have the granular ion exchangers act in stages on the liquids, especially if the ion exchange processes do not take place completely within one stage. In such cases, a particularly complete treatment of the liquid with the granular ion exchangers is obtained by selecting stepwise counter current operation using a plurality of zones. In this connection, it is advisable to bring the regeneration liquids into contact with the ion exchanger circuits which are used in series, in the sequence opposite to that of the treated liquids. This method of operation affords advantages with respect to a saving of regenerating agent. However, an ion exchanger circuit can also be divided up in the manner that it simultaneously feeds two or more treatment zones. After removal from the treatment zones, the spent granular ion exchangers are again brought together in a single current in which they are fed to a zone serving for their regeneration.

The new method is particularly well suited for the treatment of liquors for softening purposes or for partial or complete salt removal. As compared with the previously customary discontinuous and continuous processes, the method of the present invention is characterized by very high economy and optimum utilization of the capacity of the granular ion exchangers. Furthermore, it is possible with the new method to soften liquors of very great hardness and remove the salts from liquors containing a large amount of salt. The degree of softening or salt-removal can be adjusted by suitable determination of the quantity of the regenerating agent or of the quantity of granular exchanger in circulation or by a suitable selection of the dimensions of the treating zone or the velocity of the passage of the water which is to be treated. Use is made of these possibilities, for instance, in the treatment of liquors on which very high requirements are not made, for example, the softening of cooling water or the partial salt removal from industrial water for the chemical industry. Similarly, the invention makes possible the recovery of potable water from marine water by means of granular ion exchangers under particularly economical conditions.

A further advantage of the invention is that less expensive regenerating agents, for instance clarified salt containing mine waters or sea waters can be used for the regeneration of the granular ion exchangers. The exchanger capacity of the granular ion exchangers in such case does not have a high value. However, this is counteracted by the fact that the granular ion exchangers circulate more frequently in a given period of time through the various zones of the apparatus than when regeneration is effected with expensive regenerating agents.

Furthermore, the percentage of those ions which still remain in the treated water can be controlled as required by using a suitable regenerating agent mixture. In this case, several regenerating agents, for instance, a salt solution and an acid solution, can be caused to act jointly in one regenerating zone.

One example of this is, for instance, the softening of water which has a relatively high carbonate hardness with a granular ion exchanger which contains both hydrogen ions and sodium ions. These ions come from the regenerating agent mixture consisting of hydrochloric acid, sodium chloride and the water necessary for dilution purposes. In other cases, it may be advisable to have the different regenerating solutions act on the exchanger material in various regeneration zones. The exchanger material can either pass through one of these zones after the other, or in case the stream of exchanger material is broken up into partial streams, at the same time. It has surprisingly been found that 3.0 and preferably 2.0 parts by volume of a modern synthetic resin ion exchanger suffice, in accordance with the present invention, for example, for the softening of water in neutral exchange and/or acid exchange when treating an hourly quantity of 100 parts by volume of water of any initial hardness.

There is produced soft water having any desired residual hardness. In order to carry out the process, there are required minimum quantities of regenerating agent which constitute 200 and preferably 150% of the theoretical quantity referred to the exchange quantity of ions. The total volumetric capacity of the ion exchange apparatus is, for instance, within limits below 3.5 and preferably below 2.5 parts by volume. The water moves with speeds of between 50 and 100 meters per hour or more through the softening zone.

When applied to the partial or complete removal of salts from water, the method is carried out, for example, in the manner that the water from which the salts are to be removed either flows through only a single treating zone in which it comes in contact with a mixture of cation and anion exchangers, or else the water flows through one treatment zone in which there are contained only cation exchangers and thereupon another treatment zone in which there are contained only anion exchangers. The water from which the salts are to be removed can also be split up into two streams and one of these streams caused to react with cation exchangers while the other is caused to react with anion exchangers. In the latter case, a water from which the salts have been partially removed is obtained. The water from which the cations have been removed by cation exchangers is degassed in degassifiers of known type outside of the apparatus of the present invention in order to remove carbon dioxide before the salts are completely removed by means of preferably strongly basic anion exchangers.

Tests have shown that in order to remove the salts from 100 parts by volume of water having a salt content of normal magnitude, for instance up to 1000 milligrams per liter, in an hour, there should be used not more than 3.5 and preferably 2.5 parts by volume cation exchanger and not more than 4.0 and preferably 3.0 parts by volume anion exchanger within the salt removing apparatus.

In case the regenerating agent and granular ion exchanger are conducted in countercurrent in the regenerating zones, the quantity of regenerating agents used in connection with the method according to the present invention, is not more than 200 and preferably 150% of the equivalent quantity of the exchanged ions.

The following examples are given by way of illustration and not of limitation:

*Example 1*

Ten cu. m. of water of a total hardness of 15 grains per gallon are to be brought in one hour to a residual hardness of 0.1 grain per gallon. There is used for this purpose, in accordance with the invention, a softening zone, the inner diameter of which is 35 cm. The water flows through this zone during the softening process with a velocity of 105 meters per hour (referred to the free filter cross section). Up to the present time, no usable method was known by which a continuously flowing stream of water could have been treated in the desired manner at such high velocities. For the treatment, there is used an apparatus corresponding to the apparatus shown in Fig. 1. As granular ion exchanger, there is used a finely granular spherical polystyrene cation exchanger.

This exchanger material contains sulfonic acid groups as active groups which impart to it a high reaction velocity. The total quantity of granular ion exchanger is 0.15 cu. m. and the total capacity of the apparatus used is 0.20 cu. m. The granular ion exchanger is circulated. The exchanger material travels downward through a regenerating zone, and a washing zone into the softening zone located below the latter. From there, it collects in a conical space and passes upward through a riser into a lock chamber which can be connected and disconnected. For the regeneration of the granular ion exchanger 6% table salt solution is used. The quantity of salt is 180% referred to the quantity theoretically necessary for the exchange of the hardness forming ions. Fifty liters of water per hour are used to prepare the regenerating solution. A part of the water was previously used in the washing zone to wash the regenerated cation exchanger. Aside from this quantity of treated water, a further 45 liters of soft water were used per hour to transport the anion exchanger from the conical filter plate into the above mentioned lock chamber. The quantity of water lost is thus only 1% referred to the soft water produced.

*Example 2*

One hundred cu. m. of water are to be desalted per hour. This water enters the desalting unit with a total salt content corresponding to a hardness of 12 grains per gallon and is desalted therein down to such a low residual salt content that the electric conductivity of the salt free water has a value between $3 \times 10^7 \Omega$ and $2 \times 10^7 \Omega$.

The granular ion exchangers are used as exchanger mixture within a desalting zone, the inner diameter of which is 1.20 meters. The flow velocity of the water during the desalting process can be calculated from this as equal to 88 meters per hour (referred to the free filter cross section). As cation exchanger, there is used a finely granular spherical polystyrene synthetic resin exchanger. It contains sulfonic acid groups which have a very high reaction velocity. The anion exchanger used in approximately the same particle size has a similar development of the synthetic resin structure, but contains quaternary ammonium bases as active groups. The total exchanger charge of the desalting units consists of 2.4 cu. m. cation exchanger and 3.3 cu. m. anion exchanger, while the total space enclosed by the apparatus is 6.8 cu. m. The apparatus itself corresponds to the one shown in Fig. 2.

The two granular ion exchangers enter a separating zone and are separated there in the manner in accordance with the invention from the recycled desalted water. From there, they are conducted by conveyor water into the collector containers which can be connected and disconnected. From the latter, they pass into the regenerating zones, and traverse the latter and the washing zones located below. Finally, they again combine in a mixing zone in which they already come in contact with the water to be desalted and pass together with the latter into the treatment zone. For the regeneration of the cation exchanger, there is used 10% hydrochloric acid in quantities of 170% referred to the equivalent quantity of exchanged cations. This means that when removing one equivalent of alkali ions, 1.7 equivalents of hydrogen ion are conducted in the form of hydrochloric acid to the apparatus. The anion exchanger is regenerated with 4% caustic soda solution, in specific quantities of 200%. For the dilution and the dissolving of the caustic soda, there is used salt free water which has previously passed through the washing zone located below the regenerating zone for the anion exchanger. For the dilution of the hydrochloric acid, there is used water which was previously used for the final washing of the cation exchanger.

We claim:

1. In the method of treating liquids with granular ion exchanger, the improvement which comprises passing the liquid to be treated through a compact moving bed of granular ion exchanger in co-current flow relationship therewith in a treatment zone, said bed comprising at least two different ion exchangers, conveying spent ion exchanger from said bed to a separation zone, separating the different ion exchangers in said separation zone, separately conveying said ion exchangers from said separation zone through substantially closed circuits to separate lock chambers, passing said ion exchangers from the respective lock chambers to separate regeneration zones, regenerating said ion exchangers in the respective regeneration zones, mixing together the regenerated ion exchangers and passing them back together to said bed of granular ion exchanger, and recovering treated liquid after passage through said bed.

2. Improvement according to claim 1 in which each of the granular ion exchangers after passage through the regeneration zone is passed through a washing zone prior to being mixed together.

3. Apparatus for the treatment of liquids with granular ion exchangers which comprises a substantially vertical chamber defining a treating zone for the maintaining of a compact downwardly moving bed of granular ion exchanger therein, means for passing liquid into said chamber in the upper portion of said zone for co-current downward passage with said moving bed through said chamber, filter means positioned in said chamber below said treating zone for the separation of liquid from granular ion exchanger, means for removing separated liquid after passage through said filter means, a lock chamber positioned above and connected to said chamber through valve means, means for passing granular ion exchanger from said bed after passage through said filter means to said lock chamber, and means for passing regenerating agent to the upper portion of said chamber.

4. Apparatus according to claim 3 in which said means for passing granular ion exchanger to said lock chamber comprises a conduit connecting the lower portion of said chamber to said lock chamber through a shut-off valve.

5. Apparatus according to claim 3 including a valve controlled liquid outlet conduit from said lock chamber.

6. Apparatus according to claim 3 including a partition permeable to the upward flow of liquid therethrough and downward flow of granular ion exchanger therethrough positioned above said means for passing liquid to be treated into the chamber and below in spaced relation to the means for passing regenerating agent to the upper portion of the chamber, and including a valve controlled liquid outlet at the upper portion of the chamber.

7. Apparatus for the treatment of liquids with granular ion exchanger which comprises a substantially closed chamber defining a mixing zone, a liquid inlet for passing liquid to be treated into said mixing zone, a treating zone connected to the lower portion of said mixing zone for the maintaining of a compact downwardly moving bed of granular ion exchange material therein positioned in said chamber below said mixing zone, filter means for the separation of treated liquid and granular ion exchanger positioned in said chamber below said treating zone, means for removing treated liquid from the lower portion of said chamber after passage through said filter means, means for separating granular ion exchanger into at least two different fractions, means for passing ion exchanger from the bed in said treating zone after passage through said filter means to the separating means, means for passing each separated fraction of ion exchanger to a separate lock chamber, means defining a regeneration zone connected to each lock chamber, means for passing regenerating agent into each regeneration zone, means for passing granular ion exchanger after passage through each regeneration zone to said mixing zone for mixture together and passage downward and back to said bed of granular ion exchanger.

8. Apparatus according to claim 7 in which said filter means comprises a substantially conical filter defining an opening at its apex and in which said means for passing ion exchanger to the separating means comprises a conduit connecting the opening at the apex of said conical filter to said separating means.

9. Apparatus according to claim 7 in which said means for passing the separated fractions of ion exchanger to the lock chambers comprise a separate conduit leading from the separating means to each lock chamber and a shut-off valve for each conduit.

References Cited in the file of this patent

UNITED STATES PATENTS

| | | |
|---|---|---|
| 1,608,661 | Nordell | Nov. 30, 1926 |
| 1,620,431 | Bramwell | Mar. 8, 1927 |
| 1,740,199 | Nordell | Dec. 17, 1929 |
| 1,770,580 | Neumann | July 15, 1930 |
| 1,903,612 | Dotterweich | Apr. 11, 1933 |
| 2,003,757 | Pick | June 4, 1935 |
| 2,461,505 | Daniel | Feb. 15, 1949 |
| 2,461,506 | Daniel | Feb. 15, 1949 |
| 2,522,797 | Paley | Sept. 19, 1950 |
| 2,528,099 | Wilcox et al. | Oct. 31, 1950 |
| 2,572,848 | Fitch | Oct. 30, 1951 |

FOREIGN PATENTS

| | | |
|---|---|---|
| 263,183 | Germany | Aug. 2, 1913 |